(12) United States Patent
Kanayama et al.

(10) Patent No.: US 9,030,763 B2
(45) Date of Patent: May 12, 2015

(54) LENS DEVICE AND IMAGING DEVICE MOUNTED WITH THE LENS DEVICE

(71) Applicant: FUJIFILM Corporation, Tokyo (JP)

(72) Inventors: Shigehiro Kanayama, Saitama (JP); Minoru Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/230,814

(22) Filed: Mar. 31, 2014

(65) Prior Publication Data

US 2014/0313600 A1 Oct. 23, 2014

Related U.S. Application Data

(63) Continuation of application No. PCT/JP2012/074723, filed on Sep. 26, 2012.

(30) Foreign Application Priority Data

Sep. 30, 2011 (JP) .................................. 2011-218530

(51) Int. Cl.
| | |
|---|---|
| *G02B 9/00* | (2006.01) |
| *G02B 9/08* | (2006.01) |
| *G02B 26/02* | (2006.01) |
| *G02B 7/10* | (2006.01) |
| *G02B 5/00* | (2006.01) |
| *G02B 7/06* | (2006.01) |

(52) U.S. Cl.
CPC ................ *G02B 26/023* (2013.01); *G02B 7/10* (2013.01); *G02B 5/005* (2013.01); *G02B 7/06* (2013.01)

(58) Field of Classification Search
CPC .... G03B 17/14; G03B 9/06; G03B 2217/002; G03B 11/00; G03B 7/14; G02B 5/005; G02B 5/28; G01J 3/51; H04N 5/2352; H04N 5/2353; H04N 5/35581
USPC .......... 359/704, 825, 830, 738–740; 396/241; 348/360, 342, 221.1
See application file for complete search history.

(56) References Cited

U.S. PATENT DOCUMENTS 7,559,709 B2 * 7/2009 Oh ................................ 396/510

FOREIGN PATENT DOCUMENTS

| JP | 05-292392 | 11/1993 |
|---|---|---|
| JP | 09-186922 | 7/1997 |

(Continued)

OTHER PUBLICATIONS

International Search Report, PCT/JP2012/074723, Jan. 8, 2013.
(Continued)

*Primary Examiner* — Alicia M Harrington
(74) *Attorney, Agent, or Firm* — Young & Thompson

(57) ABSTRACT

A lens device is used with an imaging device having a imaging-lens and an aperture stop device. The lens device includes a lens barrel that houses the imaging-lens and the aperture stop device, a first operation ring that is on an outer circumferential portion of the lens barrel and that is rotatable in a circumferential direction of the outer circumferential portion about an axis line of the lens barrel in order to adjust the aperture-area of the aperture stop device, and a second operation ring that is parallel with the first operation ring and is rotatable in the circumferential direction of the outer circumferential portion about the axis line of the lens barrel in order to adjust a transmittance of a variable light transmission filter.

13 Claims, 17 Drawing Sheets

(56) References Cited

FOREIGN PATENT DOCUMENTS

| | | |
|---|---|---|
| JP | 2006-126504 | 5/2006 |
| JP | 2007-243928 | 9/2007 |
| JP | 2008-003171 | 1/2008 |
| JP | 2009-251557 | 10/2009 |
| JP | 2011-049737 | 3/2011 |
| JP | 2011-090033 | 5/2011 |

OTHER PUBLICATIONS

Written Opinion, PCT/IPEA/237, Jan. 8, 2013.
International Preliminary Examination Report, PCT/IPEA/409, Oct. 18, 2013.

* cited by examiner

PRIOR ART

LENS DEVICE AND IMAGING DEVICE MOUNTED WITH THE LENS DEVICE

CROSS REFERENCE TO RELATED APPLICATIONS

This application is a Continuation of PCT International Application No. PCT/JP2012/074723 filed on Sep. 9, 2012, which claims priority under 35 U.S.C. §119(a) to Patent Application No. 2011-218530 filed in Japan on Sep. 30, 2011, all of which are hereby expressly incorporated by reference into the present application.

BACKGROUND OF THE INVENTION

1. Field of the Invention

The present invention relates to a lens device mounted on a video camera or a television camera. In particular, the present invention relates to a lens device, which has both of an operation tool that manually operates an aperture stop device so as to adjust an amount of incident light and an operation tool that manually adjusts an amount of transmitted light of a variable light transmission filter, and an imaging device mounted with the lens device.

2. Description of the Related Art

As the device that adjusts the amount of incident light, an aperture stop (iris) device is generally used. For example, an aperture stop device 100 shown in FIG. 17 is configured such that a plurality of (six, in the example shown in the drawing) aperture stop blades 101, which functions as an iris, is disposed on a circumference and a driving point 102 of each blade 101 is moved in a direction of an arrow 104 centered on a supporting point 103 so as to decrease an aperture area (aperture size) of a center hole 105 which transmits incident light.

In the aperture stop device 100, when the amount of incident light is intended to be decreased, the center hole 105 is narrowed. However, when a bright outdoor image is photographed at a minimum aperture position, blurring which is caused by a decrease in a resolving power decreased by the effect of the diffraction phenomenon, so-called small aperture blurring may occur, and may deteriorate a quality of a photographed image.

For this reason, as the device that adjusts the amount of incident light, for example, an ND filter disclosed in JP2007-243928A to be described later has been proposed. The ND filter is formed as a discoid filter in which a density of a dimming material continuously changes along the circumference. In addition, by adjusting the rotation position of the discoid filter, the amount of transmitted light of the filter is controlled.

Further, a light amount adjustment device disclosed in JP2006-126504A has been proposed. In the light amount adjustment device, electrodes are provided on both surfaces of a discoid dielectric elastomer placed on the optical path, a voltage applied between the electrodes is adjusted, and a thickness of the discoid film is controlled, thereby realizing the ND filter of which the amount of transmitted light is variable.

By inserting the variable light transmission filter exemplified in JP2007-243928A and JP2006-126504A into the aperture stop device shown in for example FIG. 17, it is possible to avoid occurrence of small aperture blurring even when photographing the bright outdoor image. However, in the variable light transmission filter, it is difficult to perform imaging that blurs the background through adjustment of the depth of field performed by adjusting the aperture stop diameter, the adjustment being regarded as an advantage of the aperture stop device.

That is, both the aperture stop device and the variable light transmission filter are able to adjust the amount of incident light, but both have advantages and disadvantages for other functions.

For this reason, as disclosed in the following JP-H09-186922A and JP-H05-292392A, imaging devices, which use both the aperture stop device and the variable light transmission filter (variable ND filter) in combination, have been proposed. In such imaging devices, it is possible to perform appropriate exposure in any imaging condition, it is also possible to avoid small aperture blurring, and it is also possible to adjust the depth of field. However, since costs increase in order to mount two light amount adjustment means, it is difficult to apply the above-mentioned configuration to an actual device.

SUMMARY OF THE INVENTION

In recent years, considerable progress has been made in reduction in manufacturing costs and enhancement in performance of the variable light transmission filter, and thus it is possible to mount both the aperture stop device and the variable light transmission filter on an actual imaging device.

However, in the lens device mounted on the imaging device, there are multiple adjustment tools (operation tools), such as a magnification adjustment ring and a focus position adjustment ring of the zoom lens, which a photographer operates with only the sense of touch of the hand while viewing a finder device. Hence, when the adjustment tool of the aperture stop device and the adjustment tool of the variable light transmission filter are mounted on the actual device, it is necessary to consider which specific mount form is better to provide a lens device excellent in usability.

An object of the present invention is to provide a lens device, which is capable of performing various kinds of image capturing appropriate for an intention of a photographer by using the variable light transmission filter and the aperture stop device having in common a function of adjusting the amount of transmitted light and which is excellent in usability, and an imaging device mounted with the lens device.

(1) A lens device for an imaging device having a imaging-lens and an aperture stop device that adjusts an aperture area, the lens device including: a lens barrel that houses the imaging-lens and the aperture stop device; a first operation ring that is provided on an outer circumferential portion of the lens barrel at a desired position and is provided to be rotatable in a circumferential direction of the outer circumferential portion about an axis line of the lens barrel as a rotation axis in order to adjust the aperture area of the aperture stop device; a second operation ring that is provided in parallel with the first operation ring and provided to be rotatable in the circumferential direction of the outer circumferential portion about the axis line of the lens barrel as the rotation axis in order to adjust a transmittance of a variable light transmission filter; and a mechanism section that transfers rotations of the first operation ring and the second operation ring to each other and blocks the rotations. A rotation direction, in which the aperture area of the aperture stop device is increased by the first operation ring, is the same as a rotation direction in which the transmittance of the variable light transmission filter is increased by the second operation ring. The mechanism section is configured to be able to convert the rotations of the first operation ring and the second operation ring into rotations in directions the same as each other or directions opposite to each other and transfer the rotations.

(2) An imaging device including the lens device of (1).

According to the present invention, a photographer, who photographs a moving image of an object with a television camera or a video camera, is able to perform various kinds of exposure control through combination between adjustment of an aperture area of the aperture stop and adjustment of the amount of transmitted light of the variable light transmission filter. Hence, it is possible to photograph images according to various kinds of intention in imaging. Through a turning operation of either one of the first operation ring and the second operation ring and a rotation of the other ring interlocking through the mechanism section, it is possible to adjust the depth of field by adjusting the aperture size of the aperture stop device while suppressing change in the amount of transmitted light. Thereby, through a manual operation, it is possible to easily obtain a blur condition of the background appropriate for the intention of the photographer.

DESCRIPTION OF THE PREFERRED EMBODIMENTS

Figure 1:
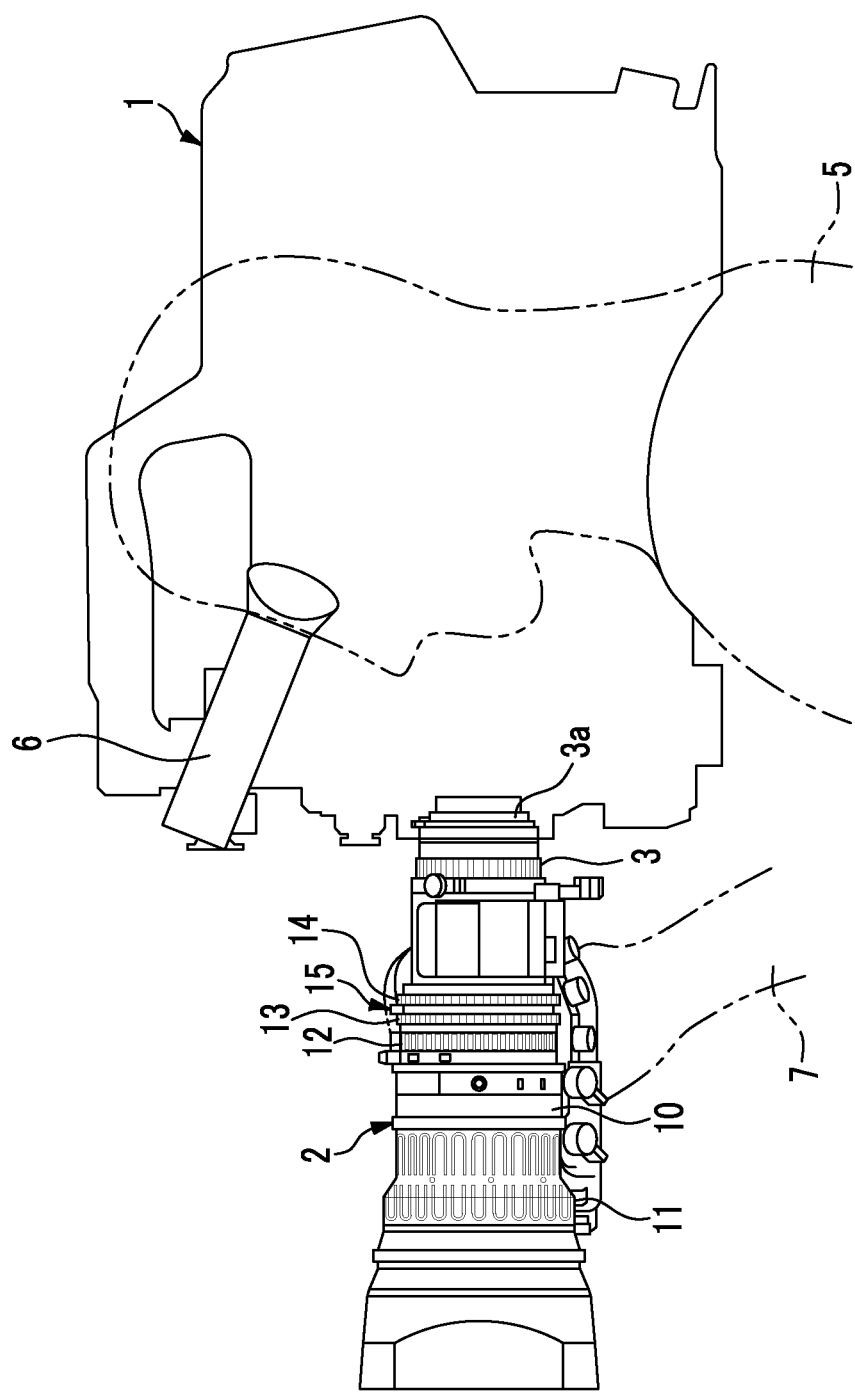
FIG. 1 is a diagram schematically illustrating a configuration of an example of a lens device and an imaging device mounted with the lens device according to an embodiment of the present invention.

FIG. 1 is a diagram schematically illustrating a configuration of an example of a lens device and an imaging device mounted with the lens device according to an embodiment of the present invention.

A lens device 2 is mounted on the front part of an imaging device main body 1.

The lens device 2 has a lens barrel 10 that has a barrel shape such as a cylindrical shape. Into the lens barrel 10, imaging-lenses such as a zoom lens and a focus lens and an aperture stop device capable of adjusting the aperture size are built. Further, in the present example, a variable light transmission filter is also built into the lens device 2. A mount section 3 is provided on the base of the lens barrel of the lens device 2. By detachably mounting a connection portion 3a of the mount section 3 on a lens mount section provided in the front part of the imaging device main body 1, the lens device 2 is fixed onto the imaging device main body 1.

In the connection portion 3a, various kinds of connection terminals (electric terminals), which are not shown, are provided. Further, in the lens mount section, connection terminals (electric terminals) corresponding to the various kinds of connection terminals on the lens device side are provided. By mounting the lens device 2 on the imaging device main body 1, electric connection is made for each corresponding connection terminal. Thereby, a not-shown control unit (CPU) of the lens device 2 acquires necessary information of the imaging device main body 1 side. Further, the control unit (CPU) on the imaging device main body 1 side acquires necessary information of the lens device 2 side.

A photographer 5 views a finder device 6 with the right eye while carrying the imaging device main body 1 on the right shoulder. Further, the photographer 5 photographs a moving image of an object while fixing the imaging device by holding a grip portion of the lens device 2 with a right hand 7. At this time, the photographer 5 operates various kinds of operation tools provided in the lens device 2 with the sense of touch of the left hand.

In the lens device 2, for example, a focus position adjustment tool (focus ring 11), which adjusts a focus position of a focus lens, is provided in a ring shape on the lens leading end side (object side) such that it can be turned around the outer circumference of the lens barrel 10. By rotating the focus ring 11 to an arbitrary angle with the left hand, the photographer 5 adjusts the focus position.

In the middle part of the lens device 2, the zoom position adjustment tool (zoom ring 12), which adjusts a zoom position of a zoom lens, is provided in a ring shape such that it can be turned around the outer circumference of the lens barrel 10. By rotating the zoom ring 12 to an arbitrary angle with the left hand, the photographer 5 adjusts a zoom ratio.

In the lens device 2, on the side closer to the imaging device main body 1 than the zoom ring 12, an aperture adjustment tool 13 of the aperture stop device and a light transmission adjustment tool 14 of the variable light transmission filter are provided. The adjustment tools 13 and 14 may be disposed to be adjacent to each other in a direction of the optical axis of the lens device 2, and which one is disposed on the object side is optional.

The aperture stop position adjustment tool 13 of the aperture stop device is provided as an iris ring 13 such that it can be turned around the outer circumference of the lens barrel 10. The light transmission adjustment tool 14 of the variable light transmission filter is formed as an ND filter ring 14 according to the shape of the iris ring 13 in the present embodiment, and is provided to be able to be turned around the outer circumference of the lens barrel 10. The iris ring 13 and the ND filter ring 14 are provided to be parallel in a direction perpendicular to the optical axis and be rotatable about the same axis.

When a filter of a type adjusting the amount of transmission by a voltage as disclosed in JP2006-126504A is used as the variable light transmission filter, it is necessary to convert the rotation angle of the ND filter ring 14 into a voltage value. Hence, in this case, a potentiometer for rotation angle detection is mounted on an inner circumferential wall of the ND filter ring 14.

The aperture stop device adjusted by the iris ring 13 and the variable light transmission filter adjusted by the ND filter ring 14 have in common a function of adjusting the amount of transmitted light, and also have in common the operational feel of both rings 13 and 14 at the time of adjusting the amount of transmitted light. That is, a relationship of an increase or a decrease of the amount of transmitted light relative to the rotation direction of the iris ring 13 is set to be the same as a relationship of an increase or a decrease of the amount of transmitted light relative to the rotation direction of the ND filter ring 14.

For example, by rotating the iris ring 13 in the direction of the arrow A (refer to FIG. 3), the aperture stop device is adjusted to increase the aperture size (to increase the amount of transmitted light). In addition, by rotating the ND filter ring 14 in the same direction, the variable light transmission filter is adjusted to increase the transmittance (to increase the amount of transmitted light).

Furthermore, the lens device 2 is provided with a mechanism section 15 that is engaged with the iris ring 13 and the ND filter ring 14 so as to transfer rotations of the rings 13 and 14 to each other and block the rotations of the rings 13 and 14.

Figure 2A:
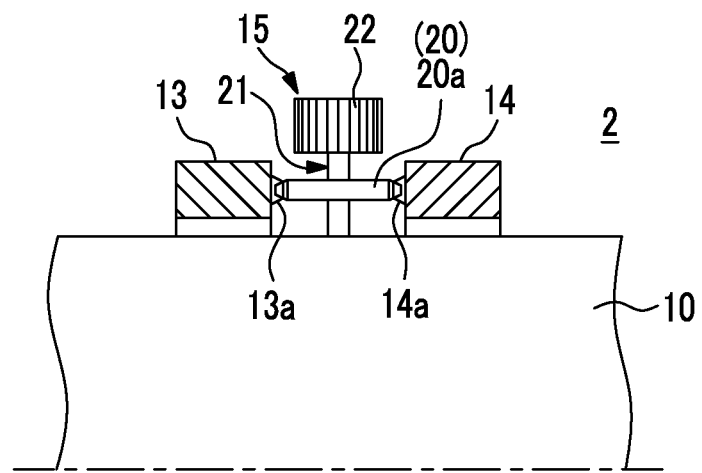
FIGS. 2A and 2B are diagrams illustrating configurations of the first operation ring and the second operation ring of the lens device of FIG. 1 and a mechanism section.
Figure 2B:
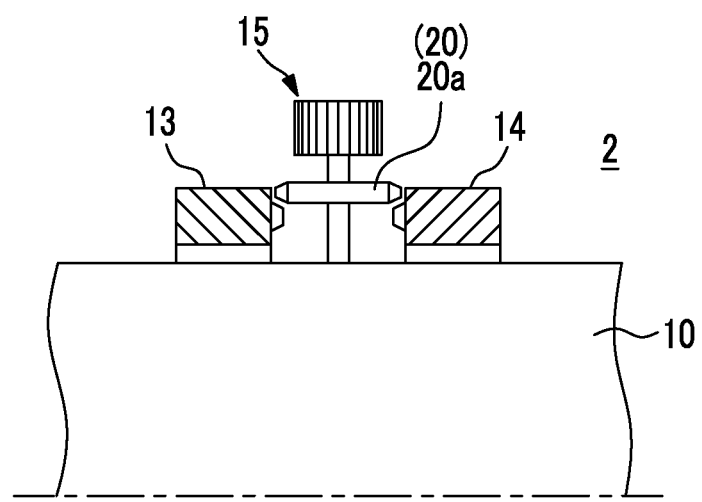

FIGS. 2A and 2B show configurations of the iris ring 13, the ND filter ring 14, and the mechanism section 15.

The iris ring 13 and the ND filter ring 14 are disposed to be adjacent to each other with a predetermined distance therebetween in the optical axis direction of the lens device 2, and the mechanism section 15 is disposed at a position between the iris ring 13 and the ND filter ring 14.

In FIGS. 2A and 2B, the mechanism section 15 has a first gear mechanism 20, which is formed of an odd number of gears, and a supporting portion 21 which supports the first gear mechanism 20. In the example shown in the drawings, the first gear mechanism 20 is formed of a single gear 20a so as to rotatably support the gear 20a. Teeth meshed with the gear 20a are formed on each of the facing side surfaces of the iris ring 13 and the ND filter ring 14 between which the mechanism section 15 is interposed. It should be noted that the first gear mechanism 20 is configured to be supported by the supporting portion 21. However, the first gear mechanism 20 and the supporting portion 21 may be integrally formed, and may constitute the first gear mechanism 20.

The supporting portion 21 is supported by the lens barrel 10 so as to be movable in the diameter direction of the iris ring 13 and the ND filter ring 14, and has an operation portion 22 which projects outside the iris ring 13 and the ND filter ring 14 in the diameter direction. A photographer performs an operation to push and pull the operation portion 22 in the diameter direction, whereby the mechanism section 15 is selectively disposed at a first position corresponding to the inside end of the movable range thereof in the diameter direction or a second position corresponding to the outside end of the movable range thereof in the diameter direction. The supporting portion 21 may have a structure which is capable of obtaining a click feeling when disposed at the first and second positions.

When the mechanism section 15 is disposed at the first position (FIG. 2A), the gear 20a is meshed with each of the teeth 13a of the iris ring 13 and the teeth 14a of the ND filter ring 14, and the first gear mechanism 20 is engaged with the iris ring 13 and the ND filter ring 14.

When the mechanism section 15 is disposed at the second position (FIG. 2B), the meshing of the gear 20a with the teeth 13a of the iris ring 13 and the teeth 14a of the ND filter ring 14 is released, and the engagement of the first gear mechanism 20 with the iris ring 13 and the ND filter ring 14 is released.

Figure 3A:
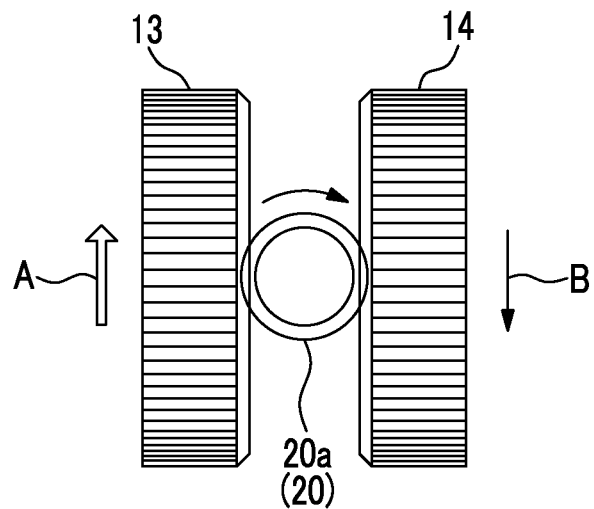
FIGS. 3A and 3B are diagrams illustrating transfer and blocking of rotations of the first operation ring and the second operation ring performed by the mechanism section of FIGS. 2A and 2B.
Figure 3B:
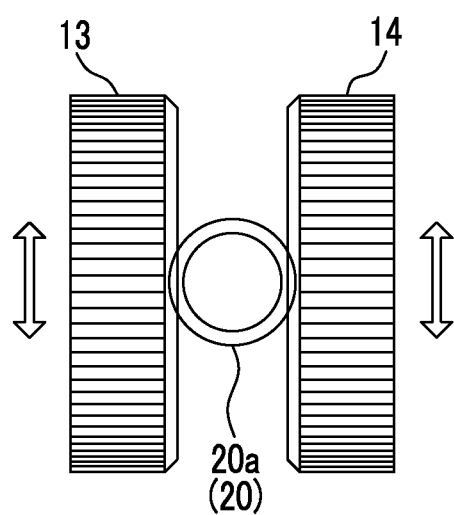

FIGS. 3A and 3B show transfer and blocking of the rotations of the iris ring 13 and the ND filter ring 14 performed by the mechanism section 15. It should be noted that, in the drawings, the outlined arrow indicates a movement (rotation) direction of a driving element which is operated by the photographer, and the solid line arrow indicates a movement (rotation) direction of a driven element.

When the mechanism section 15 is disposed at the first position (FIG. 3A), as described above, the first gear mechanism 20 is engaged with the iris ring 13 and the ND filter ring 14. In this state, when any one ring of the iris ring 13 and the ND filter ring 14 is turned, the rotation is transferred to the other ring through the first gear mechanism 20. The first gear mechanism 20 is formed of an odd number of gears (the single gear 20a in the example shown in the drawings), and the rotation of one ring is reversed, and is transferred to the other ring. For example, when the iris ring 13 is turned in the direction of the arrow A, the rotation is reversed by the first gear mechanism 20, and is transferred to the ND filter ring 14, and the ND filter ring 14 rotates in a direction of the arrow B opposite to the direction of the arrow A. It should be noted that the first gear mechanism 20 may be formed of not only an odd number of gears but also an even number of gears. In this case, due to the turning operation of the iris ring 13, the rotation is transferred, as rotation in the same direction, to the ND filter ring 14 by the first gear mechanism 20, and thus the ND filter ring 14 rotates in the same direction as the iris ring 13.

Since the relationship of the increase or the decrease of the amount of transmitted light relative to the rotation direction of the iris ring 13 is set to be the same as the relationship of the increase or the decrease of the amount of transmitted light relative to the rotation direction of the ND filter ring 14, due to the turning operation of the iris ring 13 and reverse rotation of the ND filter ring 14 interlocking therewith, while suppressing the change in the amount of transmitted light, it is possible to adjust the depth of field by adjusting the aperture size of the aperture stop device. Thereby, for example, it is possible to easily obtain the blur condition of the background appropriate for an intention of the photographer even through a manual operation. In addition, as will be described in detail later, a correspondence relationship between a rotation angle of the iris ring 13 and a light amount ratio, which is a ratio of an amount of exit light to an amount of light incident into the aperture stop device, and a correspondence relationship between a rotation angle of the ND filter ring 14 and the transmittance of the variable light transmission filter are configured to be relations of geometrical progressions which are the same in terms of progressions of ratios of amounts of transmitted light at respective rotation angles based on an amount of unitary angular change. This configuration is desirable since it is possible to keep the amount of transmitted light constant in the above operation.

When the mechanism section 15 is disposed at the second position (FIG. 3B), as described above, the engagement of the first gear mechanism 20 with the iris ring 13 and the ND filter ring 14 is released. Accordingly, the rotations of the iris ring 13 and the ND filter ring 14 are blocked from each other, and the iris ring 13 and the ND filter ring 14 are separately operable to be turned in both forward and reverse directions. Accordingly, by turning the iris ring 13 and the ND filter ring 14 in the same direction, both amounts of transmitted light of the aperture stop device and the transmittance variable filter are increased or decreased. As a result, it is possible to enhance adjustability of the amount of transmitted light. Thereby, for example, it is possible to perform imaging immediately in response to even an excessively large change in the luminance of the object relative to the adjustability of the amount of transmitted light of the aperture stop device. In particular, the iris ring 13 and the ND filter ring 14 are disposed to be adjacent to each other in the optical axis direction of the lens device 2, and this configuration is appropriate for when both rings 13 and 14 are simultaneously turned.

Figure 4A:
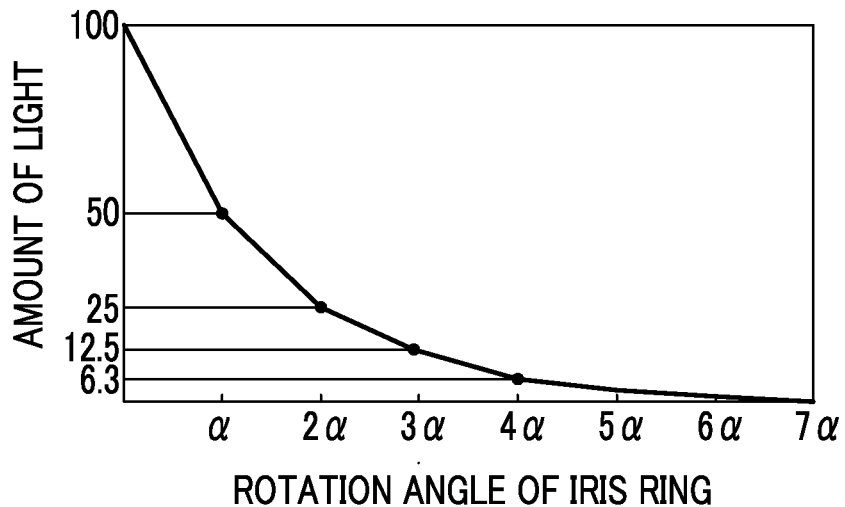
FIGS. 4A and 4B are graphs illustrating examples of relationships of the amounts of transmitted light relative to the respective amounts of operation (rotation angles) of the first operation ring and the second operation ring in the lens device of FIG. 1.
Figure 4B:
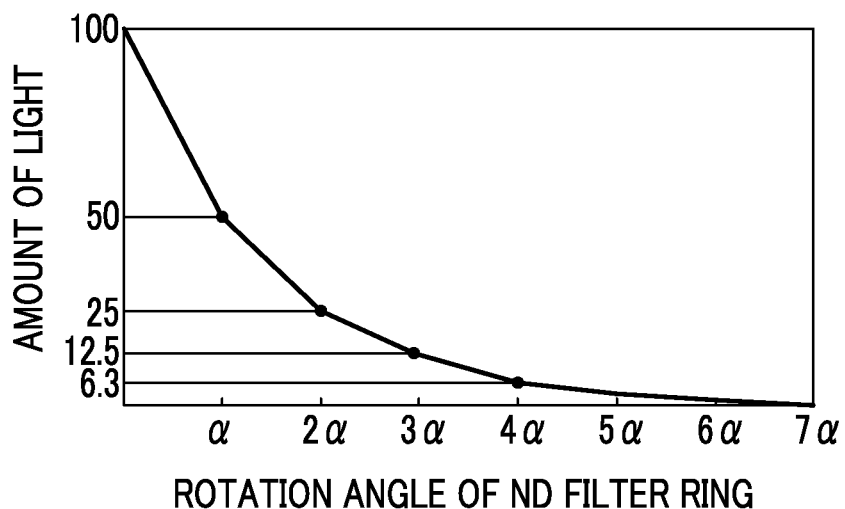

FIGS. 4A and 4B are graphs illustrating examples of relationships of the amounts of transmitted light relative to the respective amounts of operation (rotation angles) of the iris ring 13 and the ND filter ring 14.

The iris ring 13 is configured such that the amount of transmitted light of the aperture stop device is 50% at the rotation angle $\alpha$ to the origin position (at which the amount of transmitted light of the aperture stop device is 100%), the amount of transmitted light is 25% at the rotation angle $2\alpha$, the amount of transmitted light is 12.5% at the rotation angle $3\alpha$, the amount of transmitted light is 6.3% at the rotation angle $4\alpha$, . . . (FIG. 4A). In order to obtain the same operational feel as the operational feel of the iris ring 13, also in the ND filter ring 14, the amount of transmitted light of the variable light transmission filter is set to 50% at the rotation angle $\alpha$ to the origin position (at which amount of transmitted light of the variable light transmission filter is 100%), the amount of transmitted light is set to 25% at the rotation angle $2\alpha$, the amount of transmitted light is set to 12.5% at the rotation angle $3\alpha$, the amount of transmitted light is set to 6.3% at the rotation angle $4\alpha$, . . . (FIG. 4A). That is, a rotation direction, in which the aperture area of the aperture stop device is increased by the iris ring 13, is the same as a direction in which the transmittance of the variable light transmission filter is increased by the ND filter ring 14. In addition, the relationships of the amounts of transmitted light relative to the respective amounts of operation (rotation angle) of the iris ring 13 and the ND filter ring 14 are relationships of geometrical progressions which are the same in that a geometrical ratio is 1/2 in terms of progressions of ratios of amounts of transmitted light (100%, 50%, 25%, . . . ) at respective rotation angles (origin, $\alpha$, $2\alpha$, . . . ) based on an amount of unitary angular change $\alpha$.

For example, as disclosed in JP2006-126504A, when the amount of transmitted light of the variable light transmission filter is controlled on the basis of the voltage value applied to the filter, control voltage values corresponding to the rotation angles $\alpha$, $2\alpha$, and $3\alpha$, . . . of the ND filter ring 14 are set, and the voltage values are applied to the electrodes of the variable light transmission filter, thereby achieving the amounts of transmitted light corresponding to the rotation angles.

Further, as will be described later, the amount of transmitted light of the variable light transmission filter is subjected to feedback control such that the relative relationship between the rotation angle of the ND filter ring 14 and the amount of transmitted light of the variable light transmission filter coincides with the relative relationship between the rotation angle of the iris ring 12 and the amount of transmitted light of the aperture stop device with high accuracy.

According to the above-mentioned relationships of the amounts of transmitted light relative to the respective amounts of operation (rotation angles) of the iris ring 13 and the ND filter ring 14, due to the turning operation of the iris ring 13 and the reverse rotation of the ND filter ring 14 interlocking therewith through the mechanism section 15, the amount of transmitted light is kept constant. It should be noted that in each graph of FIGS. 4A and 4B, the light amount points for each rotation angle $\alpha$ are connected by straight lines, but the effect thereof is the same even in the correspondence between the rotation angle and the light amount in which the points are connected by a curve.

Figure 5A:
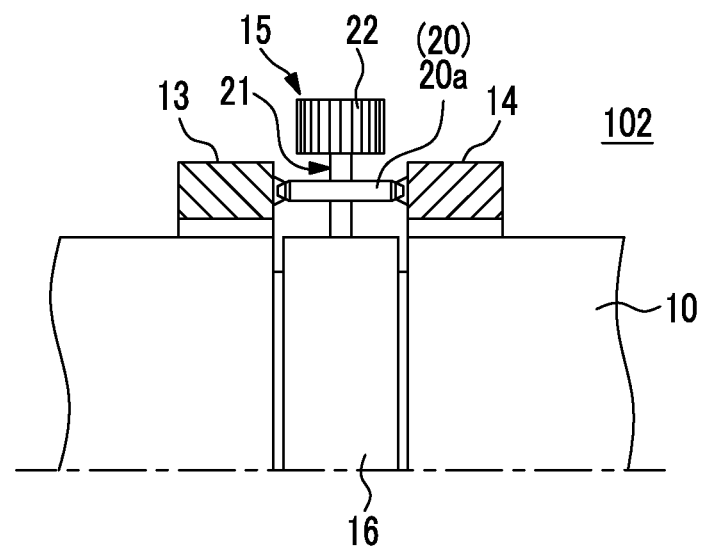
FIGS. 5A and 5B are diagrams schematically illustrating a configuration of another example of a lens device according to an embodiment of the present invention.
Figure 5B:
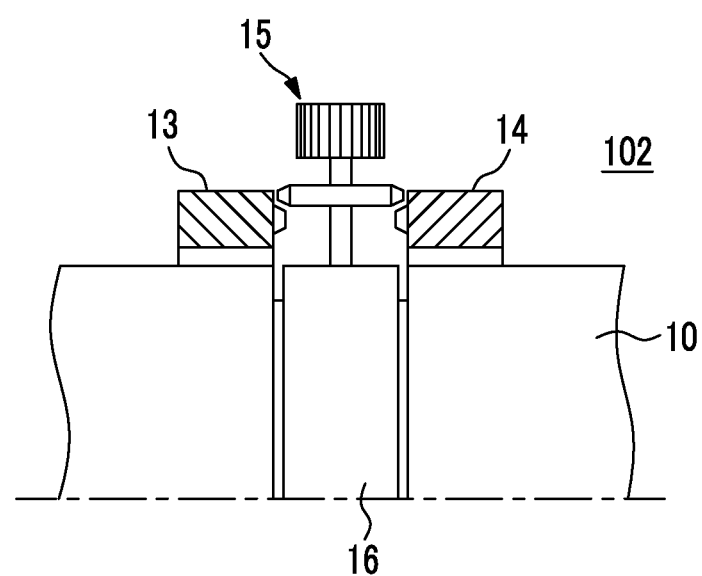

FIGS. 5A and 5B show a configuration of another example of a lens device according to an embodiment of the present invention. It should be noted that the elements common to the above-mentioned lens device 2 are referenced by the same reference numerals and signs, and a description thereof will be omitted or simplified.

The lens device 102 shown in FIGS. 5A and 5B is different from the above-mentioned lens device 2 in that the mechanism section 15 is provided to be rotatable about the same axis as the iris ring 13 and the ND filter ring 14.

The lens device 102 has a supporting ring 16 which is rotatably provided on the outer circumference of the lens barrel 10 at a position between the iris ring 13 and the ND filter ring 14. The supporting ring 16 is provided to be rotatable about the same axis as the iris ring 13 and the ND filter ring 14.

The supporting portion 21 of the mechanism section 15 is supported by the supporting ring 16 so as to be rotatable in the diameter direction of the iris ring 13 and the ND filter ring 14. The mechanism section 15 is selectively disposed at a first position corresponding to the inside end of the movable range thereof in the diameter direction or a second position corresponding to the outside end of the movable range thereof in the diameter direction. At the first position (FIG. 5A), the first gear mechanism 20 of the mechanism section 15 is engaged with the iris ring 13 and the ND filter ring 14. At the second position (FIG. 5B), the engagement of the first gear mechanism 20 of the mechanism section 15 with the iris ring 13 and the ND filter ring 14 is released.

Further, when a photographer turns the operation portion 22 around the rotation axis of the supporting ring 16, the mechanism section 15, in which the supporting portion 21 is supported by the supporting ring 16, rotates around the rotation axis of the supporting ring 16 in accordance with the rotation of the supporting ring 16.

Figure 6A:
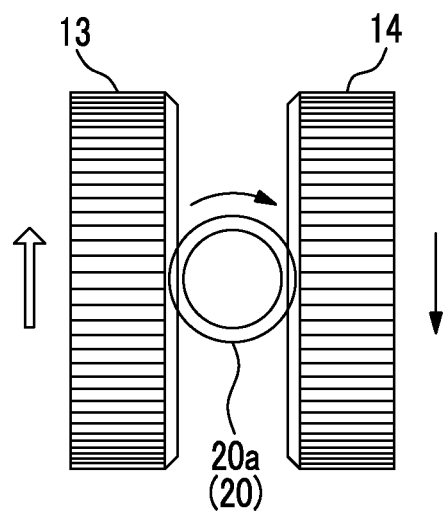
FIGS. 6A and 6B are diagrams illustrating transfer of rotations of the first operation ring and the second operation ring performed by the mechanism section of FIGS. 5A and 5B.
Figure 6B:
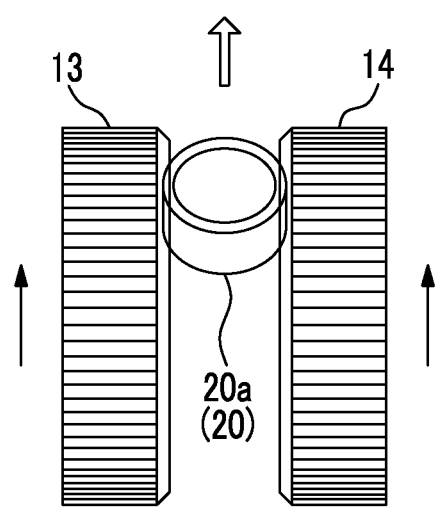

FIGS. 6A and 6B show transfer of the rotations of the iris ring 13 and the ND filter ring 14 performed by the mechanism section 15.

When the mechanism section 15 is disposed at the first position, the first gear mechanism 20 of the mechanism section 15 is engaged with the iris ring 13 and the ND filter ring 14. In this state, when any one ring of the iris ring 13 and the ND filter ring 14 is turned, the rotation thereof is reversed by the first gear mechanism 20, and is transferred to the other ring (FIG. 6A). Thereby, it is possible to adjust the depth of field by adjusting the aperture size of the aperture stop device while suppressing change in the amount of transmitted light.

Further, the first gear mechanism 20 of the mechanism section 15 is engaged with the iris ring 13 and the ND filter ring 14. In this state, the mechanism section 15 is turned around the rotation axis of the supporting ring 16, that is, around the rotation axis of the iris ring 13 and the ND filter ring 14, and then the iris ring 13 and the ND filter ring 14 rotate in the same direction at the same time (FIG. 6B). Thereby, both amounts of transmitted light of the aperture stop device and the transmittance variable filter are increased or decreased. As a result, it is possible to enhance adjustability of the amount of transmitted light.

In the above-mentioned lens device 2, in order to rotate the iris ring 13 and the ND filter ring 14 in the same direction at the same time, it is necessary to turn the two rings of the iris ring 13 and the ND filter ring 14 at the same time in the state where the mechanism section 15 is disposed at the second position. However, according to the lens device 102 of the present embodiment, simply the turning operation of the mechanism section 15 is sufficient, and thus operability is improved.

Figure 7:
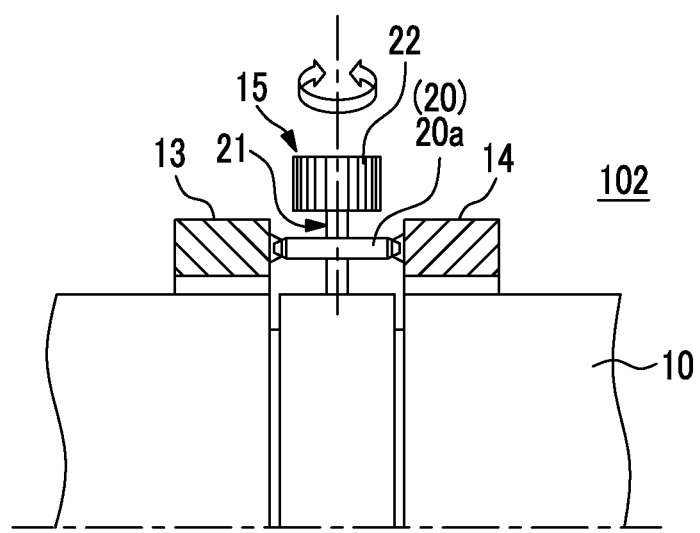
FIG. 7 is a diagram schematically illustrating a configuration of a modified example of the lens device of FIGS. 5A and 5B.

FIG. 7 shows a configuration of a modified example of the above-mentioned lens device 102.

In the lens device 102 shown in FIG. 7, the operation portion 22 of the mechanism section 15 is provided to extend in the diameter direction of the supporting ring 16 and to be twistable around the axis passing through the operation portion 22. In addition, the operation portion 22 is connected to any one gear constituting the first gear mechanism 20, and is configured to rotate the gear on its own axis in accordance with the twisting operation of the operation portion 22. In the example shown in the drawing, the first gear mechanism 20 is formed of the single gear 20a, and the operation portion 22 is connected to the gear 20a.

Figure 8A:
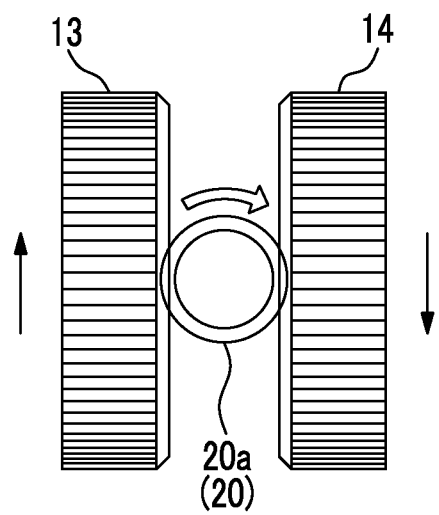
FIGS. 8A and 8B are diagrams illustrating transfer of rotations of the first operation ring and the second operation ring performed by the mechanism section of FIG. 7.
Figure 8B:
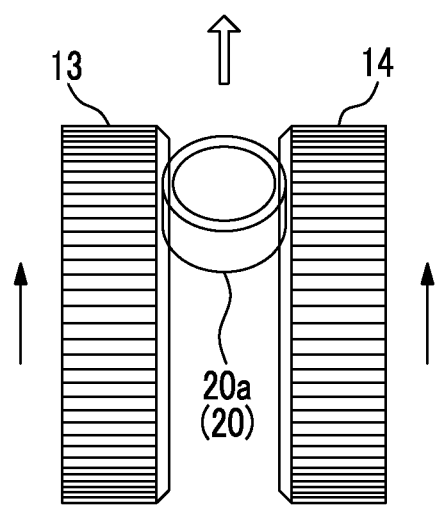

FIGS. 8A and 8B show transfer of rotations of the iris ring 13 and the ND filter ring 14 performed by the mechanism section 15.

When the mechanism section 15 is disposed at the first position, the first gear mechanism 20 of the mechanism section 15 is engaged with the iris ring 13 and the ND filter ring 14. In this state, when the operation portion 22 of the mechanism section 15 is twisted, in accordance with the twisting operation of the operation portion 22, the gear 20a constituting the first gear mechanism 20 rotates on its own axis, and the rotation thereof is transferred to each of the iris ring 13 and the ND filter ring 14 engaged with the first gear mechanism 20. Here, the first gear mechanism 20 is formed of an odd number of gears (the single gear 20a in the example shown in the drawings), and thus the rotation directions of the iris ring 13 and the ND filter ring 14 are opposite to each other. In other words, the rotation of the iris ring 13 is reversed by the first gear mechanism 20, and is transferred to the ND filter ring 14. Thereby, it is possible to adjust the depth of field by adjusting the aperture size of the aperture stop device while suppressing change in the amount of transmitted light.

Further, the mechanism section 15 is turned around the rotation axis of the supporting ring 16, that is, around the rotation axis of the iris ring 13 and the ND filter ring 14, and then the iris ring 13 and the ND filter ring 14 rotate in the same direction at the same time. Thereby, both amounts of transmitted light of the aperture stop device and the transmittance variable filter are increased or decreased. As a result, it is possible to enhance adjustability of the amount of transmitted light.

In the lens device 102 shown in FIGS. 5A and 5B, the iris ring 13 and the ND filter ring 14 may rotate in the same direction at the same time, and may rotate in the opposite directions at the same time. In the above cases, operation targets are different (in the former case, the mechanism section 15, and in the latter case, the iris ring 13 or the ND filter ring 14). In contrast, in the lens device 102 shown FIG. 7, in either case, rotation can be caused by the operation of the mechanism section 15 (in the former case, by the turning operation of the entire mechanism section 15, and in the latter case, by the twisting operation of the operation portion 22 of the mechanism section 15), and thus operability is improved.

Figure 9A:
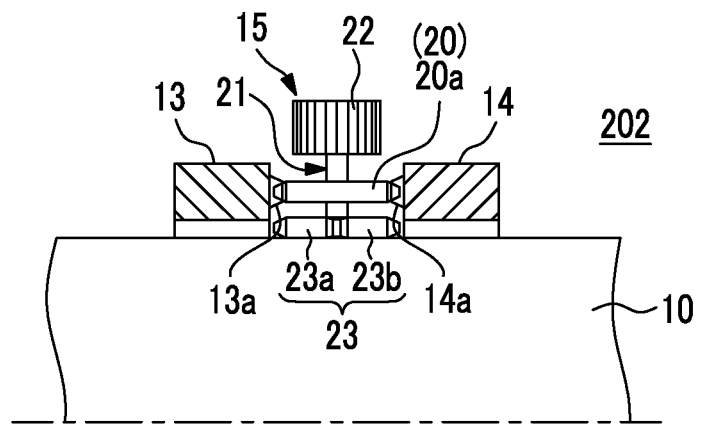
FIGS. 9A, 9B, and 9C are diagrams schematically illustrating a configuration of another example of a lens device according to an embodiment of the present invention.
Figure 9B:
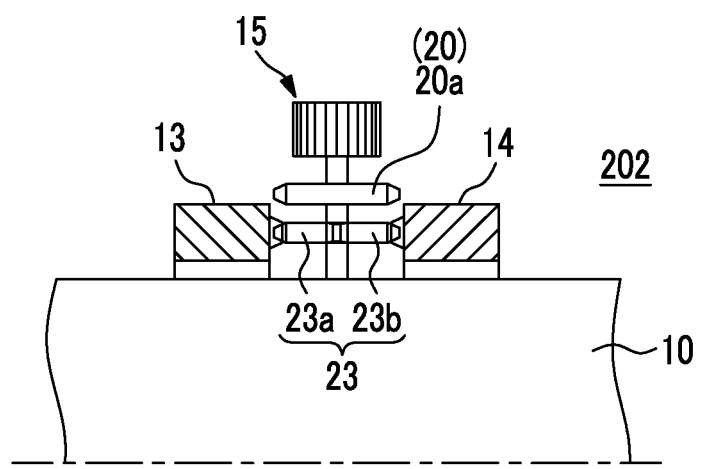

FIGS. 9A and 9B show a configuration of another example of a lens device according to an embodiment of the present invention. It should be noted that the elements common to the above-mentioned lens devices 2 and 102 are referenced by the same reference numerals and signs, and a description thereof will be omitted or simplified.

In the lens device 202 shown in FIGS. 9A and 9B, the mechanism section 15 has the first gear mechanism 20 that is formed of an odd number of gears, a second gear mechanism 23 that is formed of an even number of gears, and the supporting portion 21 that supports the first gear mechanism 20 and the second gear mechanism 23. In the example shown in the drawing, the first gear mechanism 20 is formed of the single gear 20a, and the second gear mechanism 23 is formed of two gears 23a and 23b. Teeth meshed with the gear 20a of the first gear mechanism 20 and one gear 23a of the second gear mechanism 23 are formed on the side surface of the iris ring 13. Teeth meshed with the gear 20a of the first gear mechanism 20 and the other gear 23b of the second gear mechanism 23 are formed on the side surface of the ND filter ring 14.

The supporting portion 21 is supported by the lens barrel 10 so as to be movable in the diameter direction of the iris ring 13 and the ND filter ring 14, and has the operation portion 22 which projects outside the iris ring 13 and the ND filter ring 14 in the diameter direction. A photographer performs an operation to push and pull the operation portion 22 in the diameter direction, whereby the mechanism section 15 is selectively disposed at a first position corresponding to the inside end of the movable range thereof in the diameter direction, a third position corresponding to the outside end of the movable range thereof in the diameter direction, or a second position that is positioned between the first position and the third position.

When the mechanism section 15 is disposed at the first position (FIG. 9A), the gear 20a of the first gear mechanism 20 is meshed with each of the teeth 13a of the iris ring 13 and the teeth 14a of the ND filter ring 14, and the first gear mechanism 20 is engaged with the iris ring 13 and the ND filter ring 14.

When the mechanism section 15 is disposed at the third position (FIG. 9B), one gear 23a of the second gear mechanism 23 is meshed with the teeth 13a of the iris ring 13, and the other gear 23b is meshed with the teeth 14a of the ND filter ring 14, and the second gear mechanism 23 is engaged with the iris ring 13 and the ND filter ring 14.

Figure 9C:
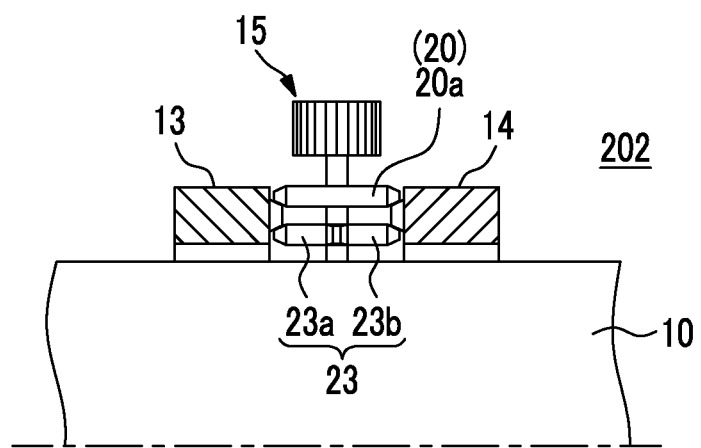

When the mechanism section 15 is disposed at the second position (FIG. 9C), the meshing of the gears 20a and 23a with the teeth 13a of the iris ring 13 is released, the meshing of the gears 20a and 23b with the teeth 14a of the ND filter ring 14 is released, and the engagement of the first gear mechanism 20 and the second gear mechanism 23 with the iris ring 13 and the ND filter ring 14 is released.

Figure 10A:
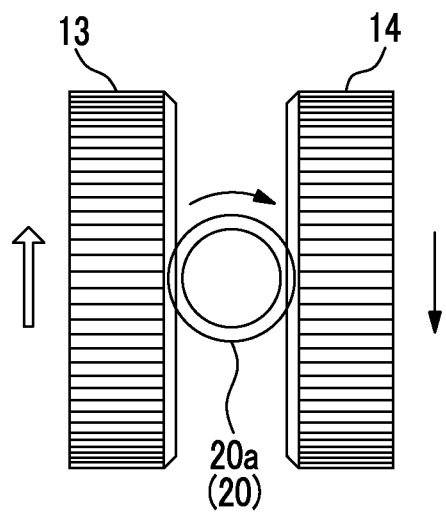
FIGS. 10A and 10B are diagrams illustrating transfer of rotations of the first operation ring and the second operation ring performed by the mechanism section of FIGS. 9A and 9B.
Figure 10B:
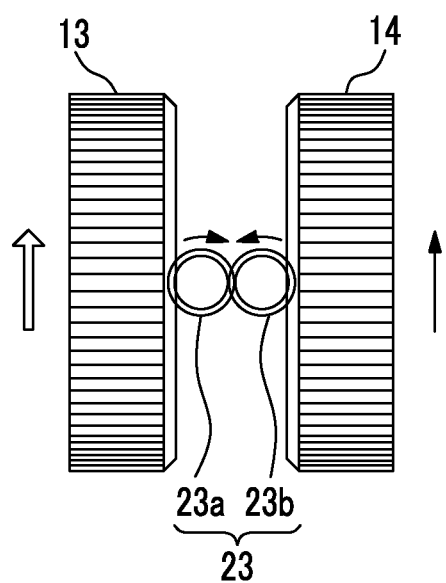

FIGS. 10A and 10B show transfer of the rotations of the iris ring 13 and the ND filter ring 14 performed by the mechanism section 15.

When the mechanism section 15 is disposed at the first position (FIG. 10A), as described above, the first gear mechanism 20 is engaged with the iris ring 13 and the ND filter ring 14. In this state, when any one ring of the iris ring 13 and the ND filter ring 14 is turned, the rotation is transferred to the other ring through the first gear mechanism 20. The first gear mechanism 20 is formed of an odd number of gears (the single gear 20a in the example shown in the drawings), and the rotation of one ring is reversed, and is transferred to the other ring.

When the mechanism section 15 is disposed at the third position (FIG. 10B), as described above, the second gear mechanism 23 is engaged with the iris ring 13 and the ND filter ring 14. In this state, when any one ring of the iris ring 13 and the ND filter ring 14 is turned, the rotation is transferred to the other ring through the second gear mechanism 23. The second gear mechanism 23 is formed of an even number of gears (the two gears 23a and 23b in the example shown in the drawings), and the rotation of one ring is not reversed, and is transferred to the other ring as rotation in the same direction.

When the mechanism section 15 is disposed at the second position, as described above, the engagement of the first gear mechanism 20 and the second gear mechanism 23 with the iris ring 13 and the ND filter ring 14 is released. Accordingly, the iris ring 13 and the ND filter ring 14 are separately operable to be turned in both forward and reverse directions.

According to the above-mentioned configuration, the iris ring 13 and the ND filter ring 14 may rotate in the same direction at the same time, and may rotate in the opposite directions at the same time. In either case, rotation can be caused by the turning operation of any one ring of the iris ring 13 and the ND filter ring 14, and thus operability is excellent.

Figure 11:
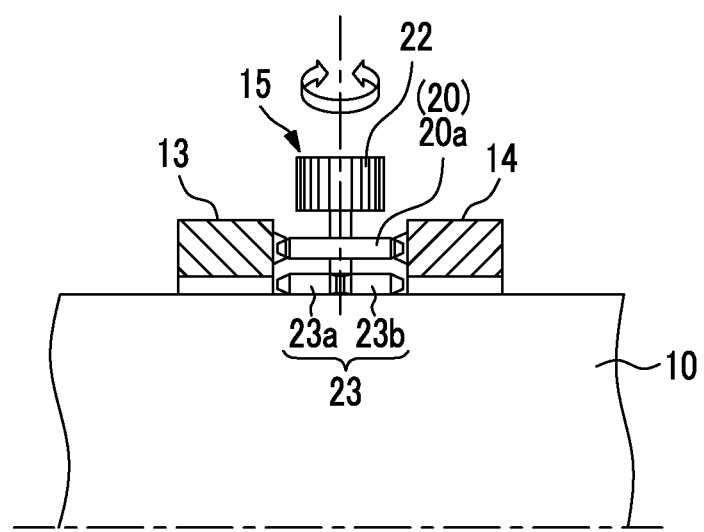
FIG. 11 is a diagram schematically illustrating a configuration of a modified example of the lens device of FIGS. 9A and 9B.
Figure 12:
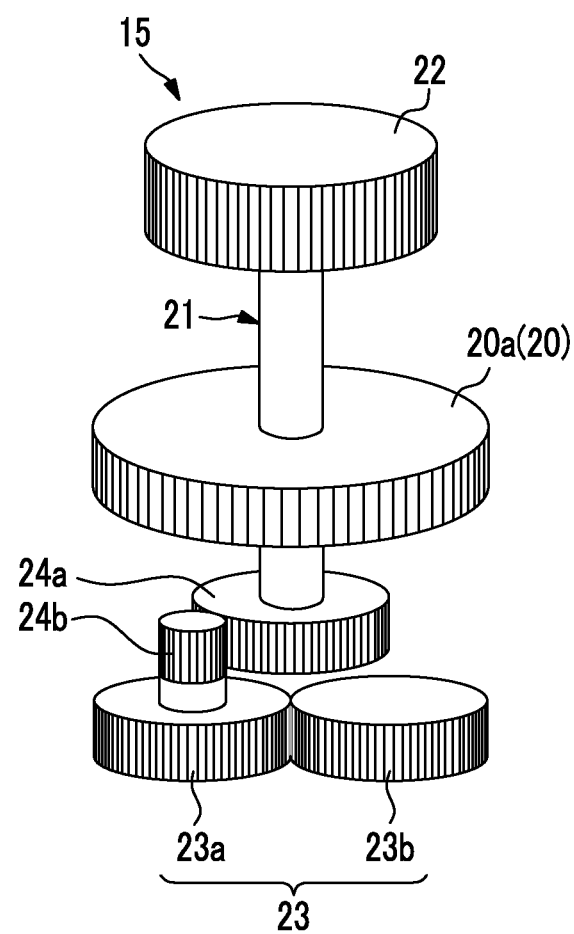
FIG. 12 is a diagram schematically illustrating a configuration of a mechanism section of the lens device of FIG. 11.

FIGS. 11 and 12 show a configuration of a modified example of the above-mentioned lens device 202.

In the lens device 202 shown in FIGS. 11 and 12, the operation portion 22 of the mechanism section 15 is provided to extend in the diameter direction of the supporting ring 16 and to be twistable around the axis passing through the operation portion 22. In addition, the operation portion 22 is connected to each of any one gear constituting the first gear mechanism 20 and any one gear constituting the second gear mechanism 23, and is configured to rotate the gears on their own axes in accordance with the twisting operation of the operation portion 22.

In the example shown in the drawing, the first gear mechanism 20 is formed of the single gear 20a, and the operation portion 22 is directly connected to the gear 20a. On the other hand, the second gear mechanism 23 is formed of the two gears 23a and 23b, and the axes of rotation of the gears 23a and 23b are different from the axis of rotation of the gear 20a of the first gear mechanism 20. Therefore, the operation portion 22 is connected to one gear 23a of the second gear mechanism 23 through gears 24a and 24b.

Figure 13A:
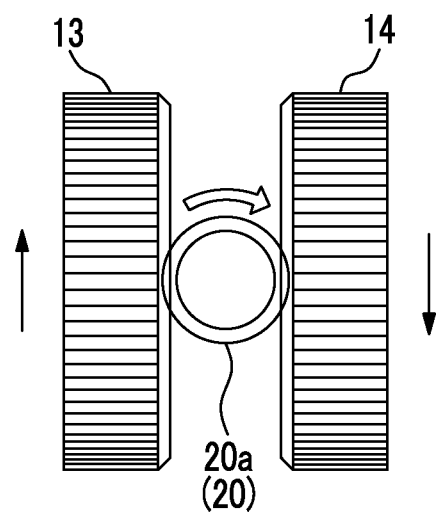
FIGS. 13A and 13B are diagrams illustrating transfer of rotations of the first operation ring and the second operation ring performed by the mechanism section of FIG. 11.
Figure 13B:
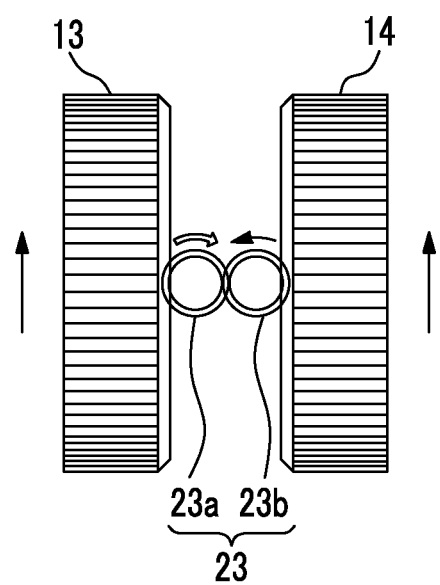

FIGS. 13A and 13B show transfer of rotations of the iris ring 13 and the ND filter ring 14 performed by the mechanism section 15.

When the mechanism section 15 is disposed at the first position (FIG. 13A), the first gear mechanism 20 of the mechanism section 15 is engaged with the iris ring 13 and the ND filter ring 14. In this state, when the operation portion 22 of the mechanism section 15 is twisted, in accordance with the twisting operation of the operation portion 22, the gear 20a constituting the first gear mechanism 20 rotates on its own axis, and the rotation thereof is transferred to each of the iris ring 13 and the ND filter ring 14 engaged with the first gear mechanism 20. Here, the first gear mechanism 20 is formed of an odd number of gears (the single gear 20a in the example shown in the drawings), and thus the rotation directions of the iris ring 13 and the ND filter ring 14 are opposite to each other.

When the mechanism section 15 is disposed at the third position (FIG. 13B), the second gear mechanism 23 of the mechanism section 15 is engaged with the iris ring 13 and the ND filter ring 14. In this state, when the operation portion 22 of the mechanism section 15 is twisted, in accordance with the twisting operation of the operation portion 22, the gear 23a constituting the second gear mechanism 23 rotates on its own axis, and the rotation thereof is transferred to each of the iris ring 13 and the ND filter ring 14 engaged with the second gear mechanism 23. The second gear mechanism 23 is formed of an even number of gears (the two gears 23a and 23b in the example shown in the drawings), and the directions of the rotations of the iris ring 13 and the ND filter ring 14 are made to be the same.

According to the above-mentioned configuration, the iris ring 13 and the ND filter ring 14 may rotate in the same direction at the same time, and may rotate in the opposite directions at the same time. In either case, rotation can be caused by the twisting operation of the operation portion 22 of the mechanism section 15, and thus operability is excellent.

Figure 14:
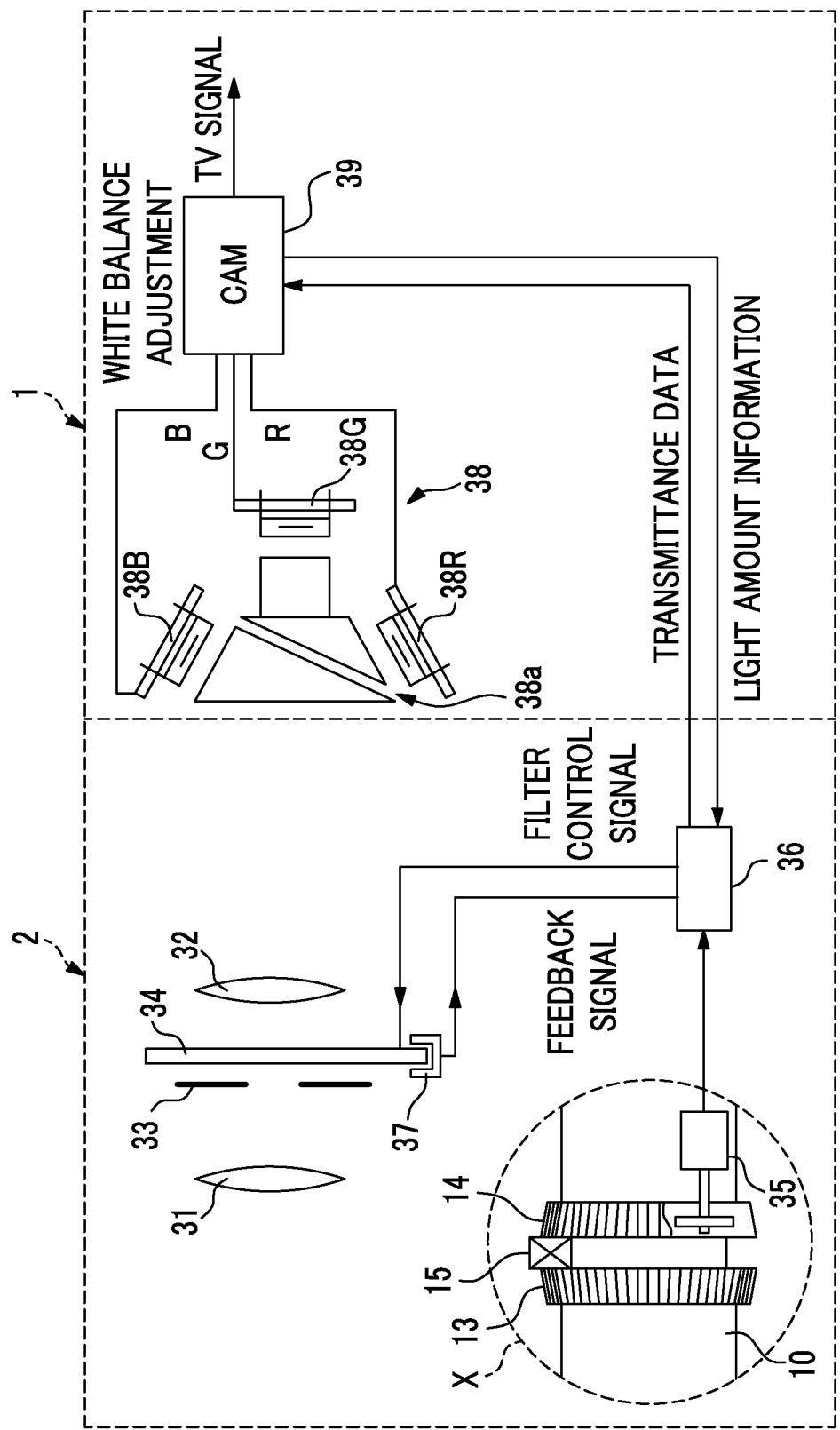
FIG. 14 is a functional block diagram of principal sections of an example of the imaging device according to the embodiment of the present invention.

FIG. 14 is a functional block diagram of principal sections of the whole imaging device in which the above-mentioned lens device 2 is mounted on the imaging device main body 1.

Figure 17:
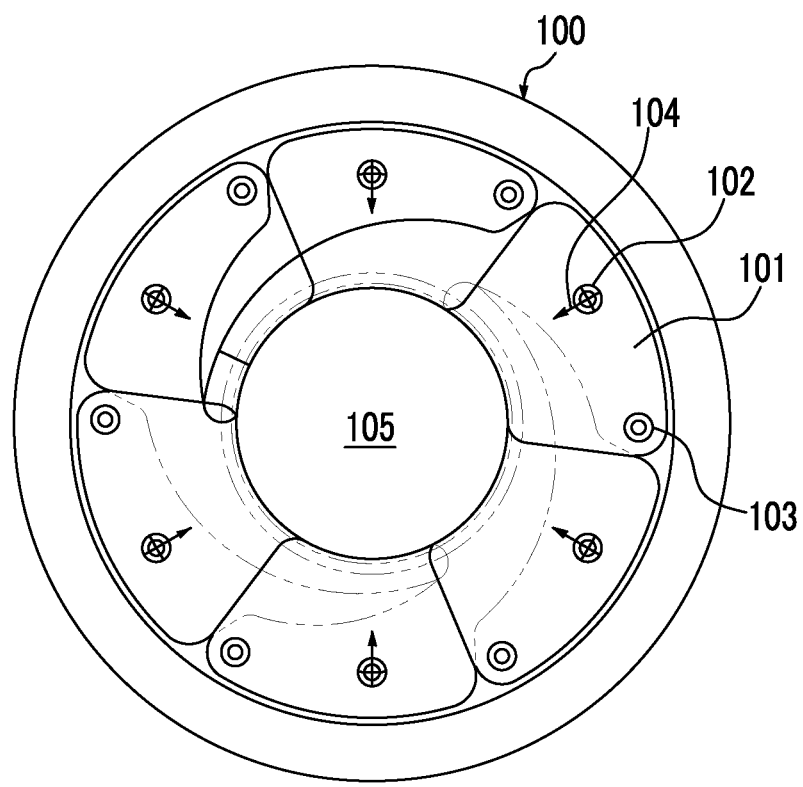
FIG. 17 is a diagram illustrating a configuration of an example of a general aperture stop device that adjusts an aperture area.

Into the lens device 2, imaging-lenses 31 and 32, an aperture stop device 33 that adjusts the aperture size (aperture area) as shown in for example FIG. 17, and a variable light transmission filter 34 are built. In this example, the aperture stop device 33 and the variable light transmission filter 34 are disposed to be close, but the aperture stop device 33 and the variable light transmission filter 34 may be separately disposed at different locations on the optical path of the incident light.

A dashed line circle X shown in FIG. 14 indicates an outer circumferential portion of the lens barrel 10 of the lens device 2. On the outer circumferential portion of the lens device 2, the iris ring 13, which adjusts the aperture size of the aperture stop device 33, and the ND filter ring 14, which adjusts the amount of transmitted light of the variable light transmission filter 34, are disposed to be adjacent. The amount of rotation of the iris ring 13 is converted into a driving force in a direction (or an opposite direction) of an arrow 104 shown in FIG. 17 of the aperture stop device 33 through a mechanical or electrical driving mechanism.

On the inner circumferential portion of the ND filter ring 14, a potentiometer 35, which detects the amount of operation (rotation angle) of the ND filter ring 14, is provided. An ND filter control section 36 reads the rotation angle which is detected by the potentiometer 35, applies a voltage value according to the rotation angle to an electrode of the variable light transmission filter 34, and controls the amount of transmitted light.

A transmittance monitor 37 is disposed in the vicinity of the variable light transmission filter 34. The transmittance detected by the monitor 37 is fed back to the ND filter control section 36 and is subjected to feedback control so as to be the transmittance (amount of transmitted light) according to the rotation angle detected by the potentiometer 35.

The transmittance monitor 37 is formed of a light emitting element and a light receiving element, between which the circular disc of the variable light transmission filter 34 is interposed, so as to detect the transmittance of the variable light transmission filter 34 on the basis of the amount of light emitted by the light emitting element and the amount of light received by the light receiving element.

Into the imaging device main body 1, an imaging device module 38 is built. The imaging device module 38 shown in the drawing is formed of: a prism 38a that separates the incident light transmitted through the lens device 2 into optical paths of three colors of red (R), green (G), and blue (B); an imaging device 38R that detects red light (R light) separated by the prism 38a; an imaging device 38G that detects green light (G light) separated by the prism 38a; and an imaging device 38B that detects blue light (B light) separated by the prism 38a.

The detection signals of the respective imaging devices 38R, 38G, and 38B are subjected to white balance correction by a camera image processing section (CAM) 39, and are then output as, for example, television signals.

A camera image processing section 21 feeds a captured image signal, which is captured by the imaging device module 38, as light amount information back to the ND filter control section 36 of the lens device 2. The ND filter control section 36 controls the transmittance of the variable light transmission filter 34 in consideration of also the fed-back information.

Further, it is ideal that the variable light transmission filter 34 keep the transmittance constant at all wavelengths in a imaging wavelength region without wavelength dependency in the transmittance. However, practically the balance of RGB is slightly different, and thus as the transmittance is changed, the balance of RGB is slightly changed. Hence, it is desirable that the camera image processing section 21 acquire the transmittance information from the ND filter control section 36, and perform white balance correction on the basis of the correction value which is preset using the transmittance information. The preset correction value can be obtained by photographing a white object with a light source having a constant intensity while changing the transmittance of the variable light transmission filter 34.

It should be noted that, in the imaging device of FIG. 14, the imaging device mounted on the imaging device main body 1 is a three-plate imaging device, but may be a single-plate imaging device.

Figure 15:
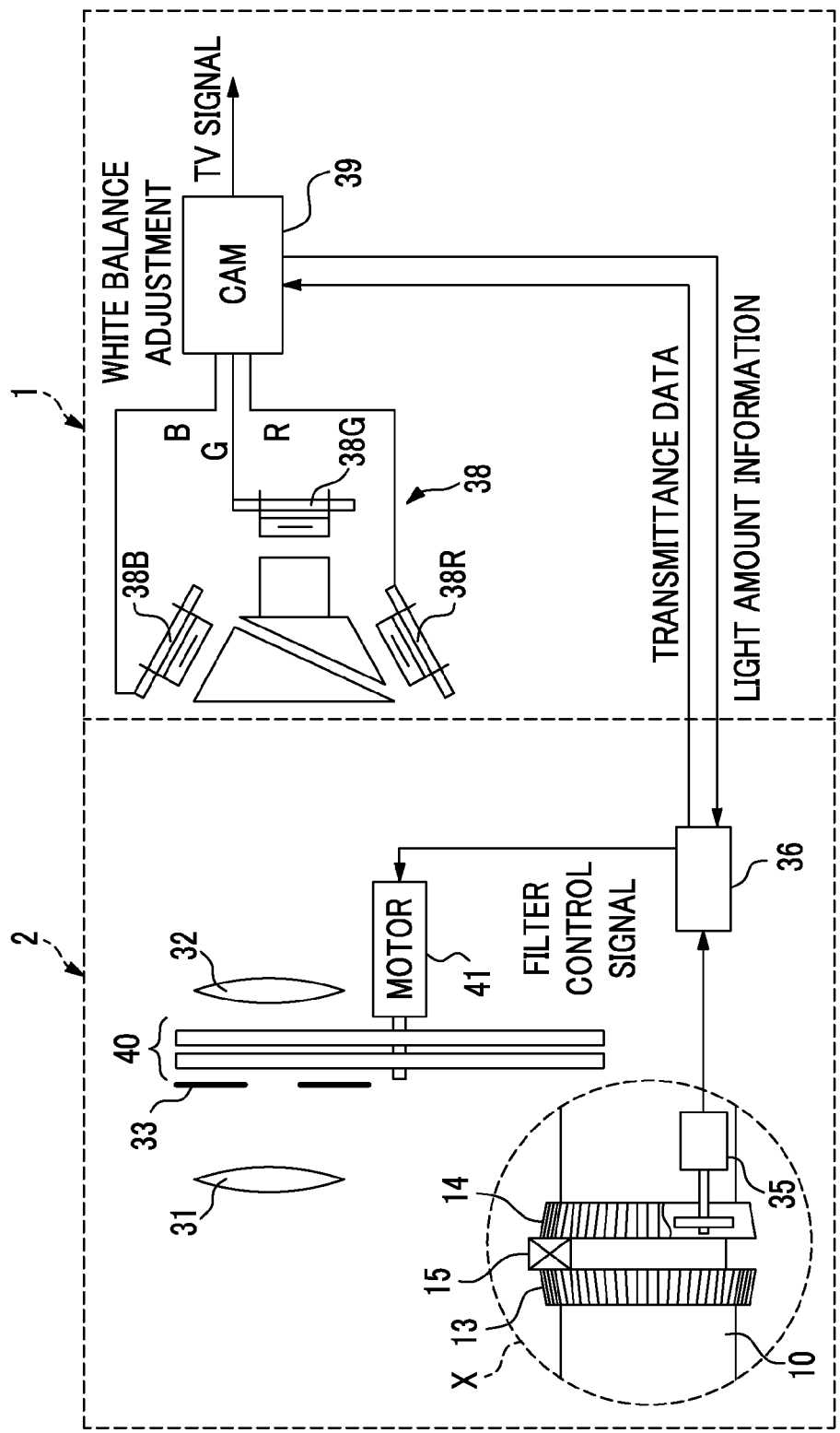
FIG. 15 is a functional block diagram of principal sections of another example of the imaging device according to the embodiment of the present invention.

FIG. 15 is a functional block diagram of principal sections of another example of the imaging device.

In the imaging device shown in FIG. 14, as the variable light transmission filter, for example, the filter, which controls the amount of transmitted light through voltage value control exemplified in JP2006-126504A, is used, but the filter exemplified in JP2007-243928A may be used. The filter forms gradation on a transparent circular disc by using a dimming material. That is, the filter is manufactured in a state where the density of the dimming material is adjusted such that, as the rotation angle increases, the transmittance gradually increases, where the transmittance is 0% at the position of the rotation angle of 0 degrees to the central axis and the transmittance is 100% at the position right before the rotation angle of 360 degrees.

The variable light transmission filter 40 is built into the lens device 2, together with the aperture stop device 33. In addition, the ND filter control section 36 issues a command to a motor 41 in accordance with the rotation angle which is detected by the potentiometer 35, and thereby controls the rotation angle position of the filter 40. Thereby, the depth of gradation on the incident light optical path of the filter 40 becomes a desired depth, and the amount of light transmitted through the filter according to the rotation position of the ND filter ring 14 is obtained. In this configuration, the gradation position of the filter 40 is determined depending on the rotation angle of the filter 40. Hence, it is not necessary to provide a feedback control system using the transmittance monitor 37 of FIG. 14.

Figure 16:
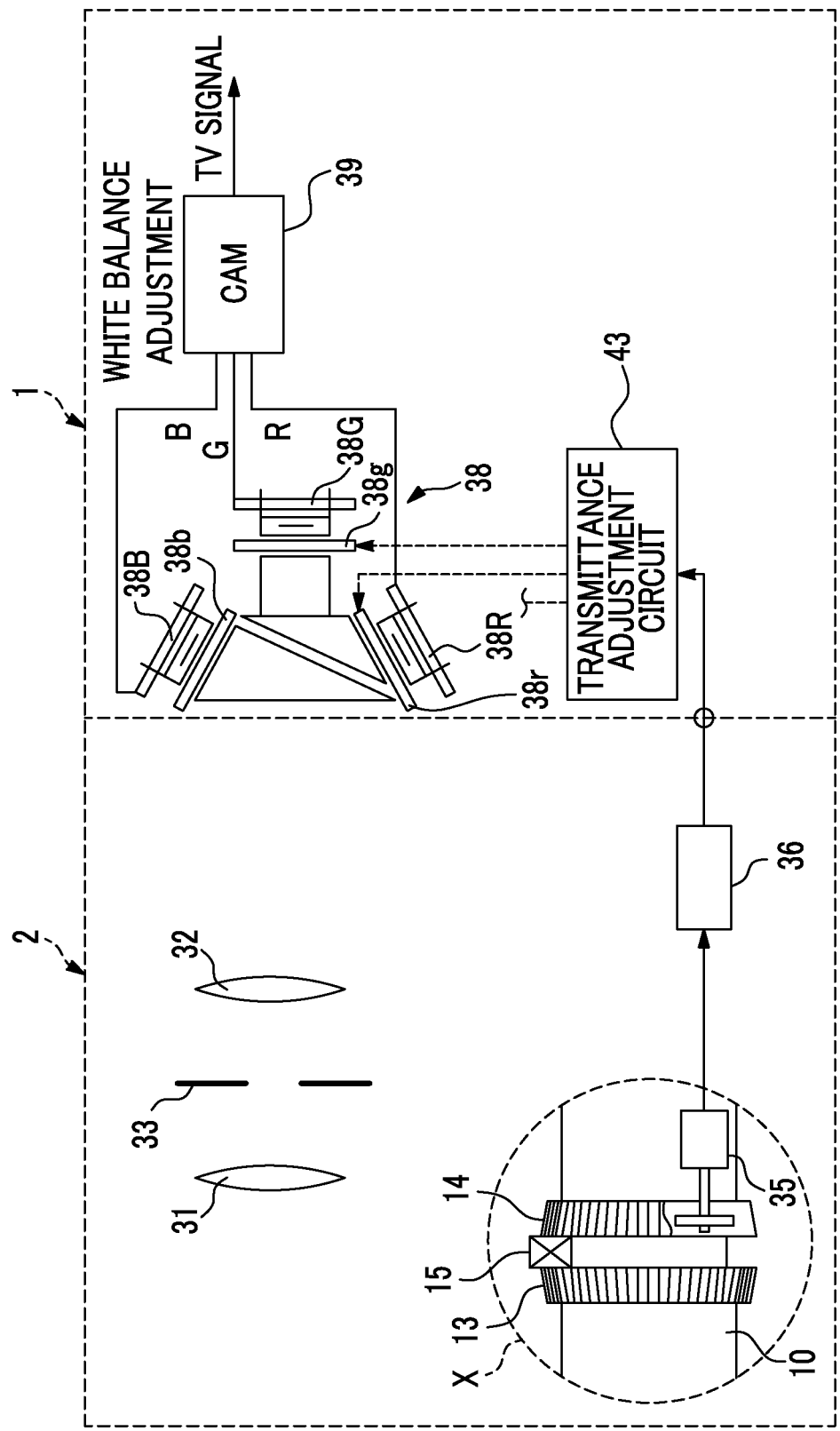
FIG. 16 is a functional block diagram of principal sections of another example of the imaging device according to the embodiment of the present invention.

FIG. 16 is a functional block diagram of principal sections of another example of the imaging device.

As described above, the operation tool (iris ring 13) of the aperture stop device 33 of which the aperture size is variable and the operation tool (ND filter ring) 14 of the variable light transmission filter are disposed on the outer circumferential portion of the lens device 2 so as to be adjacent to each other. However, it is not always necessary for the aperture stop device and the variable light transmission filter to be disposed to be close to each other.

In the imaging device shown in FIG. 16, there is the lens device 2 mounted on the imaging device main body 1 that has the built-in imaging device provided with the variable light transmission filter. In front of the imaging devices 38R, 38G, and 38B, the variable light transmission filters 38r, 38g, and 38b are disposed, respectively. The transmittances of the variable light transmission filters 38r, 38g, and 38b are controlled by the amount of operation (rotation angle) of the ND filter ring provided on the lens device 2 side.

The potentiometer 35 that detects the amount of rotation is mounted on the ND filter ring. In addition, the ND filter control section 36 is configured to transfer the detected value of the amount of rotation to a transmission adjustment circuit 43 on the imaging device main body 1 side. The transmission adjustment circuit 24 controls the transmittances of the variable light transmission filters 38r, 38g, and 38b in accordance with the detected value of the potentiometer 35.

In the imaging device shown in FIG. 16, the variable light transmission filter may be built into the lens device 2. It may be possible to adopt a configuration in which whether to use the variable light transmission filter on the imaging device main body 1 side or to use the variable light transmission filter built into the lens device 2 is selected by a switch provided in the lens device 2 and not shown in the drawing. When the variable light transmission filter built into the lens device 2 is not used, the transmittance of the variable light transmission filter is set to 100%. The ND filter control section 36 may have a configuration for performing only the function of simply transferring the detected value of the potentiometer 35 to the imaging device main body 1 side.

As described above, in the present specification, a lens device of (1) to (10) to be described as follows is disclosed, and an imaging device of (11) to be described as follows is disclosed.

(1) a lens device for an imaging device having a imaging-lens and an aperture stop device that adjusts an aperture area, the lens device including: a lens barrel that houses the imaging-lens and the aperture stop device; a first operation ring that is provided on an outer circumferential portion of the lens barrel at a desired position and is provided to be rotatable in a circumferential direction of the outer circumferential portion about an axis line of the lens barrel as a rotation axis in order to adjust the aperture area of the aperture stop device; a second operation ring that is provided in parallel with the first operation ring and provided to be rotatable in the circumferential direction of the outer circumferential portion about the axis line of the lens barrel as the rotation axis in order to adjust a transmittance of a variable light transmission filter; and a mechanism section that transfers rotations of the first operation ring and the second operation ring to each other and blocks the rotations, in which a rotation direction, in which the aperture area of the aperture stop device is increased by the first operation ring, is the same as a rotation direction in which the transmittance of the variable light transmission filter is increased by the second operation ring, and in which the mechanism section is configured to be able to convert the rotations of the first operation ring and the second operation ring into rotations in directions the same as each other or directions opposite to each other and transfer the rotations.

(2) The lens device according to (1), in which the mechanism section has a first gear mechanism, which is formed of gears, and a supporting portion which supports the first gear mechanism, and in which the supporting portion is provided to be movable, along diameter directions of the first operation ring and the second operation ring, to a plurality of positions that includes a first position, at which the first gear mechanism is engaged with each of the first operation ring and the second operation ring, and a second position at which engagement of the first gear mechanism with each of the first operation ring and the second operation ring is released.

(3) The lens device according to (2), in which the mechanism section is configured to be able to transfer the rotations of the first operation ring and the second operation ring as rotations in the directions the same as each other.

(4) The lens device according to (3), in which the supporting portion has an operation portion that is provided to be operable to revolve around rotation axes of the first operation ring and the second operation ring and causes any one of the gears of the first gear mechanism to rotate on its own axis.

(5) The lens device according to (3), in which the mechanism section further has a second gear mechanism which is formed of gears supported by the supporting portion, and in which the plurality of positions, to which the supporting portion is movable, further includes a third position at which the second gear mechanism is engaged with each of the first operation ring and the second operation ring.

(6) The lens device according to (5), in which the supporting portion has an operation portion that causes any one of the gears of the first gear mechanism and any one of the gears of the second gear mechanism to rotate on their own axes.

(7) The lens device according to any one of (1) to (6), in which a correspondence relationship between a rotation angle of the first operation ring and a light amount ratio, which is a ratio of an amount of exit light to an amount of light incident into the aperture stop device, and a correspondence relationship between a rotation angle of the second operation ring and the transmittance of the variable light transmission filter are relations of geometrical progressions which are the same in terms of progressions of ratios of amounts of transmitted light at respective rotation angles based on an amount of unitary angular change.

(8) The lens device according to any one of (1) to (7), in which the variable light transmission filter is mounted on the lens barrel.

(9) The lens device according to (8), further including: a monitor that detects the transmittance of the variable light transmission filter; and a control section that performs feedback control on the transmittance of the variable light transmission filter and sets the transmittance, which is detected by the monitor, as a transmittance depending on an amount of an operation of the second operation ring.

(10) The lens device according to any one of (1) to (7), in which the control section in the imaging device transmits a signal based on the amount of the operation of the second operation ring to the imaging device, and controls the transmittance of the variable light transmission filter provided in the imaging device.

(11) An imaging device including the lens device according to any one of (1) to (10).

What is claimed is:

1. A lens device for an imaging device having a imaging-lens and an aperture stop device that adjusts an aperture area, the lens device comprising:
a lens barrel that houses the imaging-lens and the aperture stop device;
a first operation ring on an outer circumferential portion of the lens barrel at a desired position and that is rotatable in a circumferential direction of the outer circumferential portion about an axis line of the lens barrel as a rotation axis in order to adjust the aperture area of the aperture stop device;
a second operation ring in parallel with the first operation ring and that is rotatable in the circumferential direction of the outer circumferential portion about the axis line of the lens barrel as the rotation axis in order to adjust a transmittance of a variable light transmission filter; and
a mechanism section that switches between an engagement state of the first operation ring and the second operation ring in which rotation of the first operation ring and the second operation ring are transferred to each other, and a non-engagement state of the first operation ring and the second operation ring in which the transfer of the rotation is blocked,
wherein a rotation direction, in which the aperture area of the aperture stop device is increased by the first operation ring, is the same as a rotation direction in which the transmittance of the variable light transmission filter is increased by the second operation ring, and
wherein the mechanism section is configured to convert the rotations of the first operation ring and the second operation ring into rotations in directions the same as each other or directions opposite to each other.

2. The lens device according to claim 1,
wherein the mechanism section has a first gear mechanism, which is formed of gears, and a supporting portion which supports the first gear mechanism, and
wherein the supporting portion is provided to be movable, along diameter directions of the first operation ring and the second operation ring, to a plurality of positions that includes a first position, at which the first gear mechanism is engaged with each of the first operation ring and the second operation ring, and a second position at which engagement of the first gear mechanism with each of the first operation ring and the second operation ring is released.

3. The lens device according to claim 2,
wherein the supporting portion has an operation portion that is adapted to revolve around rotation axes of the first operation ring and the second operation ring and causes any one of the gears of the first gear mechanism to rotate on its own axis, and
wherein the mechanism section is configured to be able to transfer the rotations of the first operation ring and the second operation ring as rotations in the directions the same as each other.

4. The lens device according to claim 2,
wherein the mechanism section further has a second gear mechanism which is formed of gears supported by the supporting portion, and
wherein the plurality of positions, to which the supporting portion is movable, further includes a third position at which the second gear mechanism is engaged with each of the first operation ring and the second operation ring, and wherein the mechanism section is configured to be able to transfer the rotations of the first operation ring and the second operation ring as rotations in the directions the same as each other.

5. The lens device according to claim 4, wherein the supporting portion has an operation portion that causes any one of the gears of the first gear mechanism and any one of the gears of the second gear mechanism to rotate on their own axes.

6. The lens device according to claim 2, wherein the variable light transmission filter is mounted on the lens barrel.

7. The lens device according to claim 6, further comprising:
   a monitor that detects the transmittance of the variable light transmission filter; and
   a control section that performs feedback control on the transmittance of the variable light transmission filter and sets the transmittance, which is detected by the monitor, as a transmittance depending on an amount of an operation of the second operation ring.

8. The lens device according to claim 7, wherein the control section in the imaging device transmits a signal based on the amount of the operation of the second operation ring to the imaging device, and controls the transmittance of the variable light transmission filter provided in the imaging device.

9. An imaging device comprising the lens device according to claim 2.

10. The lens device according to claim 1, wherein the variable light transmission filter is mounted on the lens barrel.

11. The lens device according to claim 10, further comprising:
    a monitor that detects the transmittance of the variable light transmission filter; and
    a control section that performs feedback control on the transmittance of the variable light transmission filter and sets the transmittance, which is detected by the monitor, as a transmittance depending on an amount of an operation of the second operation ring.

12. The lens device according to claim 11, wherein the control section in the imaging device transmits a signal based on the amount of the operation of the second operation ring to the imaging device, and controls the transmittance of the variable light transmission filter provided in the imaging device.

13. An imaging device comprising the lens device according to claim 1.

* * * * *